Figure 1:
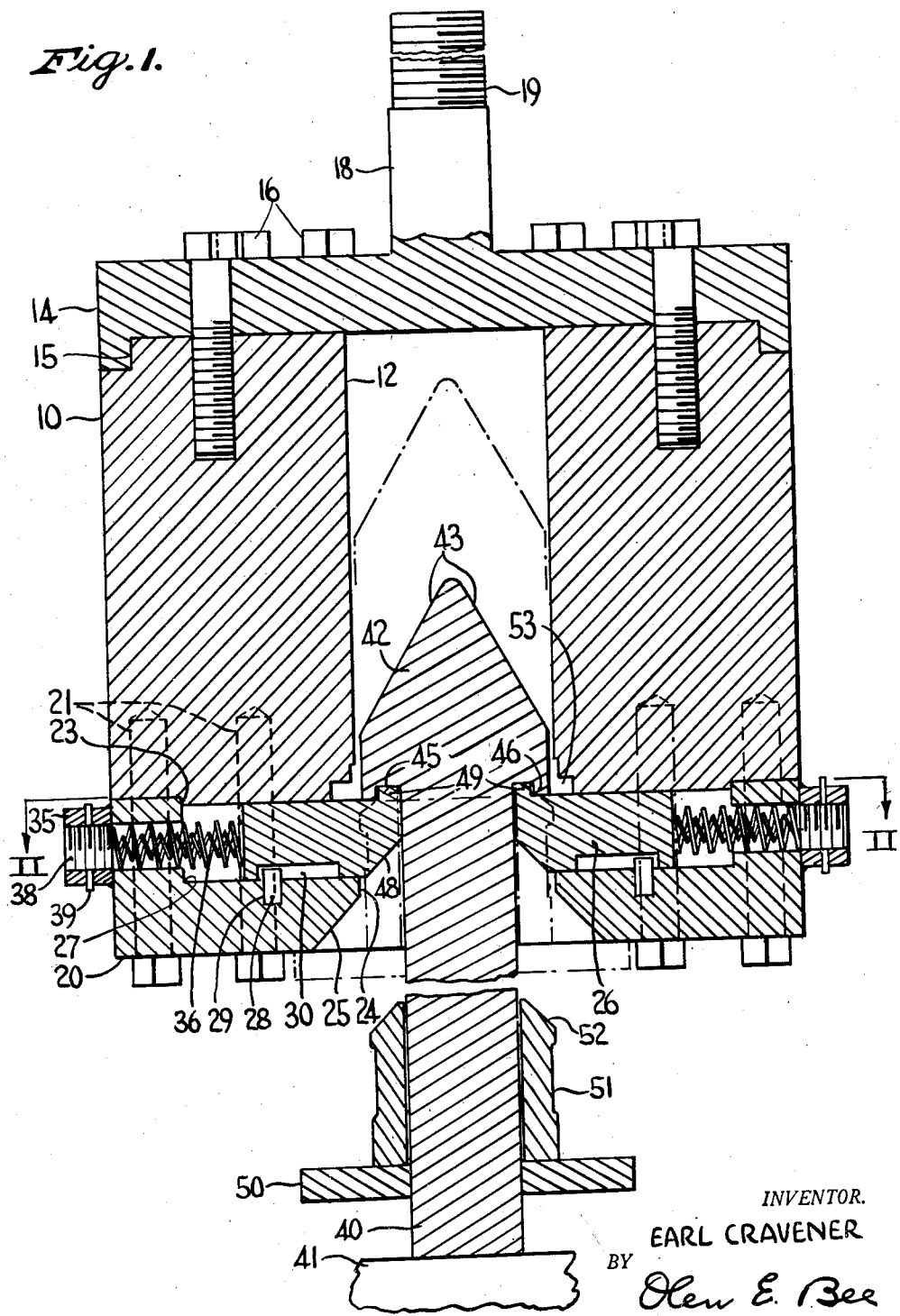

Nov. 29, 1949  E. CRAVENER  2,489,864
AUTOMATIC COUPLING
Filed Aug. 17, 1948  2 Sheets-Sheet 1

INVENTOR.
EARL CRAVENER
BY Olen E. Bee
ATTORNEY

Nov. 29, 1949     E. CRAVENER     2,489,864
AUTOMATIC COUPLING
Filed Aug. 17, 1948     2 Sheets-Sheet 2
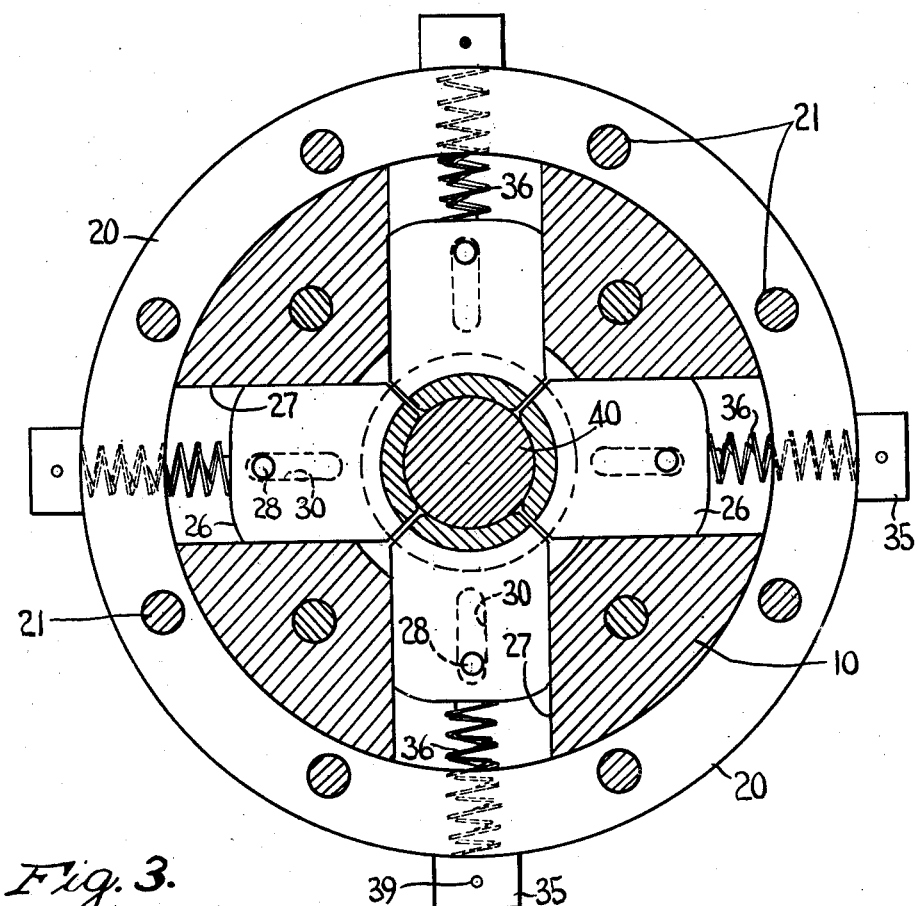
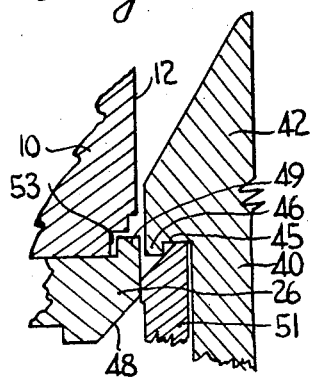
INVENTOR.
EARL CRAVENER
BY Olen E. Bee
ATTORNEY Patented Nov. 29, 1949

2,489,864

UNITED STATES PATENT OFFICE 2,489,864

AUTOMATIC COUPLING

Earl Cravener, Creighton, Pa., assignor to Pittsburgh Plate Glass Company, Allegheny County, Pa., a corporation of Pennsylvania Application August 17, 1948, Serial No. 44,770

3 Claims. (Cl. 294—86)

This invention relates to automatic couplings and one of the objects of the invention is to provide an improved crane-operated coupling adapted to be set upon equipment to be moved, automatically coupled therewith and uncoupled therefrom in response to lifting and setting movements of a crane or other lifting apparatus.

In one form of the invention a cylindrical or other form of block member adapted to be connected to a prime mover is provided with a set of spring pressed detents which are adapted to receive a coupling member which forces them apart and locks behind them upon movement to a locking position. Further inward movement of the coupling member is limited by a stop element of a releasing mechanism that is mounted on the coupling member. The releasing mechanism engages the detents and separates them still farther so as to hold them while the coupling member assumes slidable and non-locking contact with the detents. Upon return movement of the coupling member, past the detents, it first strikes the releasing member and disengages the latter so as to set the detents for another cycle of operation.

This type of construction is particularly useful in lifting heavy equipment and setting it in another position. The coupling member is anchored in an upright position upon the equipment and the block that carries the detents can be lowered thereon so as to be locked for lifting purposes. As the block approaches its fully lowered position upon the coupling member the releasing element is actuated and therefore, it is only necessary to bring the members together in predetermined relationships to initiate the automatic coupling and uncoupling of the mechanism.

In the drawing:

Figure 1 is a fragmentary vertical section taken substantially along the line I—I of Figure 2; Figure 2 is a horizontal section taken substantially along the line II—II of Figure 1; and Figure 3 is a fragmentary vertical section of portions of the operating elements shown in Figure 1 and disposed in a different position.

In practising the invention a coupling block 10 of a cylindrical or other shape that is formed with a central socket 12 running substantially axially thereof includes a cover 14 on the upper side thereof fitted thereon along rabbeted joints 15 at the marginal portions of these members. Suitable bolts 16 secure the cover rigidly upon the block to form a unitary structure. An upwardly extending rod 18, screw threaded, as indicated at 19, is integrally formed with the cover 14 and is adapted to be connected to a prime mover, not shown, such as a lifting crane.

A guide plate 20 is rigidly bolted, as indicated at 21, to the bottom side of the block 10 and is centered thereon by means of annular shoulders 23 formed adjacent the outer margins of the plate. An opening 24 formed with an outwardly flaring wall 25 registers with the central socket 12. At this location detents 26 movable radially toward and away from the entrance to the socket 12 are slidable in guides 27 formed in the lower plate 20. The upper walls of the guides are defined by the bottom surface of the block 10. Retaining pins 28 anchored rigidly in openings 29 formed in the bottom plate extend into channels 30 located in the lower portions of the detents and limit movement thereof in radial directions toward and away from the entrance to the socket 12.

Internally screw threaded nipples 35 extend integrally and radially from the plate 20 in alignment with the several detents 26 and are designed to receive springs 36 which are confined between the outer ends of the detents 26 and the inner ends of plugs 38. In order to prevent displacement of the plugs 38, they are screw threaded into the nipples and cotter pins 39 are inserted through the nipples and through the plugs.

An upright coupling member 40 has its lower end anchored rigidly upon equipment 41 which is to be lifted or moved and the upper end of the coupling is provided with an integral head 42 having an upwardly converging conical surface 43. An annular groove 45 is formed along the lower overhanging portion of the head 42 and defines a downwardly projecting annular lip 46. It is to be noted that the detents in their normal position under the compressive action of the springs 36 project inwardly into the path of entry into the socket 12 and that the lower forward marginal portions of the detents are formed with camming surfaces 48. Lips 49 are also formed on the upper forward end portions of the detents. In response to insertion of the head 42 into the socket 12 the camming surface 43 engages the camming surfaces 48 of the detents and forces them outwardly against the compression of the springs 36 until the detents snap behind the head. The lips 49 enter the grooves 45 as soon as the lifting action begins, that is, when the coupling head proceeds into the socket beyond the detents, the movement can be reversed and the head is then locked by the detents against withdrawal of the coupling from the block.

A stop plate 50 is rigidly mounted upon the coupling member 40 at a suitable distance below the head 42 and a releasing member 51 in the form of a sleeve, in this instance, is slidable upon the coupling member between the head 42 and the plate 50. After the equipment has been lifted and set at a desired location, the block 10 can be lowered until an upper camming surface 52 of the sleeve 51 slides upon the camming surface 48 to force the detents laterally or outwardly. The degree of entry of the coupling member into the socket is limited by contact of the stop plate 50 with the bottom of the guide plate 20 as indicated in broken lines of Figure 1. In this position the detents 26 bear radially against the sides of the releasing sleeve 51 adjacent its upper end to hold such sleeve frictionally in this position. The lower annular corner defining the socket is recessed, as indicated at 53, to receive the detent lips 49 when they are withdrawn to proper position for receiving the releasing sleeve in its upper coupling-releasing position.

It is to be noted that the diameter of the upper portion of the sleeve 51 frictionally engaged by the detents in this position (Figure 3) is greater than the diameter of the coupling head 42. With the mechanism in this position the block 10 is lifted from the coupling member. During this action the lower portion of the coupling head first passes inside the extremities of the surrounding detents (Figure 3) and the lower portion of the coupling head engages the upper rim of the releasing sleeve 51. At this stage of the operation during the lifting of the coupling block the detents cannot engage the coupling head because the releasing sleeve is holding the detents out of the path of withdrawal of the head from the socket. As soon as the coupling head 42 has been withdrawn, carrying the sleeve 51 with it, such sleeve falls to its normal position against the stop plate 50 and the detents assume the position of projecting into the path of entry into the socket 12 to a degree limited by the pins 28. The flaring wall 25 in the lower portion of the plate 30 leading to the detents and socket facilitates the guiding of the coupling head into locking position in such socket.

Although only one form of the invention has been shown and described in detail, it will be apparent to those skilled in the art that the invention is not so limited but that various changes can be made therein without departing from the spirit or scope of the invention as defined in the appended claims.

I claim:

1. A coupling structure comprising a block having a socket therein and having means adapted for connection to a hoisting apparatus, a lifting rod having a camming head thereon insertable into and disconnectable from said socket and adapted to be anchored on an object to be lifted, spring pressed members mounted upon the block and having camming portions normally disposed in the path of entry of said rod into the socket and being actuatable into locked relation with the camming head in response to entry of the head into the socket a predetermined degree and means movable into camming relation with the spring pressed members in response to insertion of the rod into the socket beyond said predetermined degree and to a position holding the spring pressed members out of the path of movement of the rod for unobstructed withdrawal of the head from the socket.

2. In a coupling structure for automatic locking with and release from equipment to be moved, a block having a socket therein, spring pressed detents on the block movable toward and away from the socket and having camming portions normally disposed at least partially in the path of entry into the socket, a coupling member having a locking head movable into camming relation with the camming portions of said detents and lockable behind said detents in response to such movement, a releasing element slidable on the coupling member and movable therewith into camming relation with the detents and yieldably set thereby upon movement of the coupling member a predetermined distance into said socket, said coupling member having means restricting sliding movement of the releasing element between predetermined limits thereon, said detents while held by the releasing element in set position being disposed free of locking engagement with the coupling as the head is withdrawn from the socket.

3. A coupling structure comprising a block formed with an axial socket therein, a plate secured rigidly upon one face of the block and having an opening registering with said socket as a continuation thereof, said block and plate defining between them guides communicating with the socket and extending substantially radially therefrom, cam members slidably mounted in said guides and being normally disposed at least partially in the path of entry into said socket, a coupling member having a cam head slidable in camming relation past said cam members to snap in locked relation behind the latter in response to movement of the head into the socket a predetermined degree, a stop on said coupling member spaced from the head thereof, and a releasing member slidable on said coupling member between the head and stop and engageable with the cam members in response to movement of the coupling member into the socket a predetermined degree to spread said cam members out of the path of withdrawal of the head from the socket.

EARL CRAVENER.

No references cited.